United States Patent
Saeger

(10) Patent No.: US 9,663,080 B2
(45) Date of Patent: May 30, 2017

(54) SYSTEM AND METHOD FOR BRAKING RECUPERATION IN MOTOR VEHICLE

(71) Applicant: Ford Global Technologies, Dearborn, MI (US)

(72) Inventor: Martin Saeger, Pulheim (DE)

(73) Assignee: Ford Global Technologies, Dearborn, MI (US)

( * ) Notice: Subject to any disclaimer, the term of this patent is extended or adjusted under 35 U.S.C. 154(b) by 119 days.

(21) Appl. No.: 14/670,322

(22) Filed: Mar. 26, 2015

(65) Prior Publication Data

US 2015/0274140 A1 Oct. 1, 2015

(30) Foreign Application Priority Data

Mar. 26, 2014 (DE) .................. 10 2014 205 605

(51) Int. Cl.
| | |
|---|---|
| *G06F 19/00* | (2011.01) |
| *B60T 8/172* | (2006.01) |
| *B60T 8/171* | (2006.01) |
| *B60T 1/10* | (2006.01) |
| *B60T 8/1755* | (2006.01) |

(52) U.S. Cl.
CPC .............. *B60T 8/172* (2013.01); *B60T 1/10* (2013.01); *B60T 8/171* (2013.01); *B60T 8/1755* (2013.01); *B60T 2270/613* (2013.01)

(58) Field of Classification Search
CPC . B60T 8/172; B60T 1/10; B60T 8/171; B60T 8/1755; B60T 2270/613
See application file for complete search history.

(56) References Cited

U.S. PATENT DOCUMENTS

| | | | | | |
|---|---|---|---|---|---|
| 3,986,575 | A | * | 10/1976 | Eggmann | ............... B60K 3/04 180/301 |
| 2005/0127750 | A1 | * | 6/2005 | Fuhrer | .................. B60L 7/10 303/152 |
| 2008/0211457 | A1 | * | 9/2008 | Rudorff | ............... H02J 7/0016 320/118 |
| 2008/0228368 | A1 | * | 9/2008 | Fuhrer | ................... B60L 7/16 701/81 |
| 2009/0111640 | A1 | * | 4/2009 | Buur | .................. B60K 6/445 701/70 |
| 2009/0272576 | A1 | * | 11/2009 | Medina | ............ B60R 16/0215 174/72 A |
| 2010/0211280 | A1 | * | 8/2010 | Cayol | ................... B60K 6/52 701/70 |
| 2010/0276239 | A1 | * | 11/2010 | Wuerth | ................ B60T 8/266 188/358 |

(Continued)

FOREIGN PATENT DOCUMENTS

| | | |
|---|---|---|
| DE | 102009009809 A1 | 8/2010 |
| DE | 102012217679 A1 | 4/2013 |
| DE | 102013205505 A1 | 10/2013 |

*Primary Examiner* — Ian Jen
(74) *Attorney, Agent, or Firm* — Angela M. Brunetti; Raymond Coppiellie

(57) ABSTRACT

A method, carried out in a controller of a motor vehicle having a plurality of wheels, to counteract an undesired influence on the motor vehicle. The method comprises determining, during a braking recuperation process, the undesired influence that is caused by the braking recuperation process and counteracting the determined undesired influence using a vehicle system that affects torques present at one or more wheels of the plurality of vehicle wheels.

20 Claims, 2 Drawing Sheets

(56) References Cited

U.S. PATENT DOCUMENTS

| | | | |
|---|---|---|---|
| 2011/0192661 A1* | 8/2011 | Hennings | B60T 1/10 180/65.21 |
| 2011/0248557 A1* | 10/2011 | Overzier | B60T 1/10 303/3 |
| 2013/0049450 A1* | 2/2013 | Kunz | B60T 8/267 303/3 |
| 2013/0057052 A1* | 3/2013 | Kunz | B60T 8/267 303/3 |
| 2013/0062931 A1* | 3/2013 | Kunz | B60T 8/348 303/3 |
| 2013/0076114 A1* | 3/2013 | Fukushima | B60T 1/10 303/6.01 |
| 2013/0076115 A1* | 3/2013 | Fukushima | B60T 7/042 303/6.01 |
| 2013/0204502 A1* | 8/2013 | Biller | B60L 7/18 701/70 |
| 2013/0221745 A1* | 8/2013 | Vershinin | B60L 3/108 307/10.1 |
| 2013/0292999 A1* | 11/2013 | Strengert | B60T 8/246 303/10 |

* cited by examiner

SYSTEM AND METHOD FOR BRAKING RECUPERATION IN MOTOR VEHICLE

CROSS-REFERENCE TO RELATED APPLICATIONS

This application claims priority to DE Application No. 10 2014 205605.5, filed Mar. 6, 2014, the disclosure of which is incorporated, in its entirety, by reference herein.

TECHNICAL FIELD

The inventive subject matter is directed to a system and method for carrying out braking recuperation in a motor vehicle.

BACKGROUND

During braking recuperation, kinetic energy of a motor vehicle is converted into electrical energy using a generator. However, in an electric or hybrid vehicle, an unwanted effect of braking regeneration is irregular braking "feel" or behavior. The brake pedal may feel inconsistent to a driver because the brake feel is different than that of a fully gas powered vehicle. There is a need to improve braking recuperating in such a manner that it goes unnoticed to improve not only the driving stability, but the driving comfort or the vehicle.

SUMMARY

A system and method is presented for implementing a brake recuperation process of a regenerative braking system on a motor vehicle having a plurality of wheels and a plurality of vehicle sensors. The system has a brake device to selectively brake individual wheels of the plurality of wheels and a controllable torque distribution device to selectively distribute a torque to individual wheels of the plurality of wheels at each axle of the motor vehicle. A controller on the motor vehicle is in communication with the brake device and the controllable torque distribution device. A braking recuperation process, carried out in the controller, converts kinetic energy of the motor vehicle into electrical energy. An undesired influence determining process, carried out in the controller, identities an undesired influence on the motor vehicle caused by the braking recuperation process, and a counteracting process, carried out in the controller, generates and implements a counter-reaction, to offset the undesired influence caused by the braking recuperation process. The counteracting process is a combination of a brake torque applied to at least one of the plurality of wheels by way of the braking device and adaptation of a distribution of braking torque to at least one of the wheels on the motor vehicle.

Elements and steps in the figures are illustrated for simplicity and clarity and have not necessarily been rendered according to any particular sequence. For example, steps that may be performed concurrently or in different order are illustrated in the figures to help to improve understanding of embodiments of the inventive subject matter.

DESCRIPTION OF INVENTION

While various aspects of the inventive subject matter are described with reference to a particular illustrative embodiment, the invention is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Figure 1:
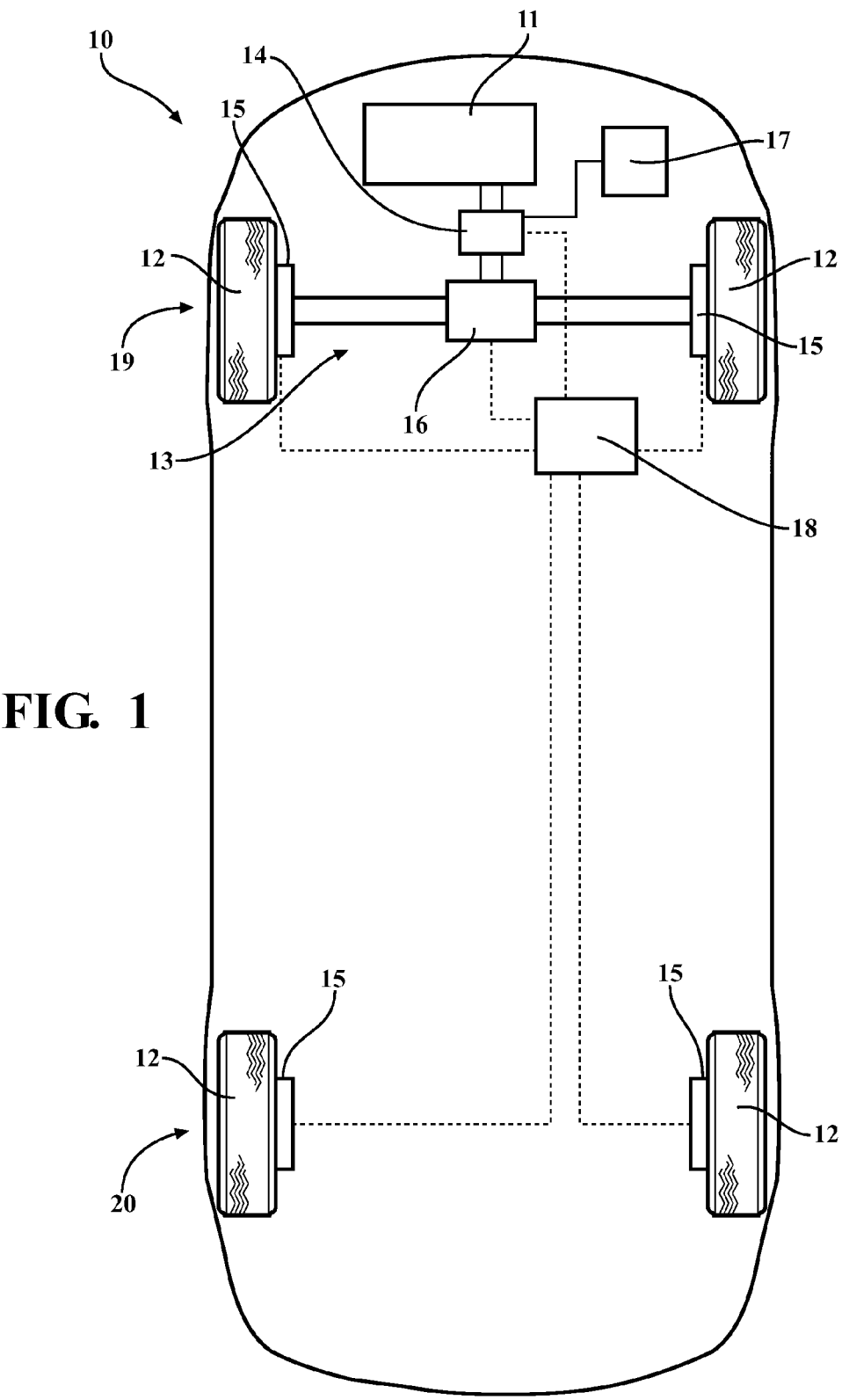
FIG. 1 is a block diagram of a vehicle having a braking recuperation system of the inventive subject matter.

FIG. 1 is a motor vehicle 10 having a braking recuperation system of the inventive subject matter. The motor vehicle 10 has wheels 12, which by way of example, has two wheels 12 at a front axle 10 which may be driven by a drive train 13. The wheels 12 of a rear axle 20 may also be driven, such as an all-wheel drive vehicle.

The drive train 13 has an electric generator 14. The drive train 13 is con figured to convert kinetic energy of the motor vehicle into electrical energy by way of the generator 14. The electrical energy that is generated during the braking recuperation process, is stored in an electric store 17, such as a battery or an accumulator. The drive train 13, therefore, is suitable for carrying out a method for braking recuperation. The motor vehicle 10 is described herein to include a regenerative brake system.

The generator 14 can also serve as an electric motor for propelling the motor vehicle 10. It is also possible that the motor vehicle 10 has an additional motor 11 for propelling the vehicle. The motor 11 may be an internal combustion engine or an electric motor. In FIG. 1 the generator 14 is arranged downstream of the motor 11 which serves as a drive source and upstream of a torque distribution device 16 on the drive train 13. The generator 14 may also be arranged at another location on the drive train 13, for example upstream of the motor 11 or downstream of the torque distribution device.

The motor vehicle 10 has a brake device 15 in addition to the regenerative brake system. The brake device 15 is preferably a friction brake system in which kinetic energy of the motor vehicle 10 is converted into heat by friction. The brake device 15 is configured in such a way as to selectively brake individual wheels 12. The braking of a plurality of wheels 12 or all of the wheels is also possible. Such brake devices are used in electronic stability systems, known as ESP's.

The torque distribution device 16 is a controllable transmission which is designed to variably distribute torque among the wheels 12. This capability is known as torque vectoring. The torque distribution device 16 also acts in an overrun mode of the motor vehicle 10.

Figure 2:
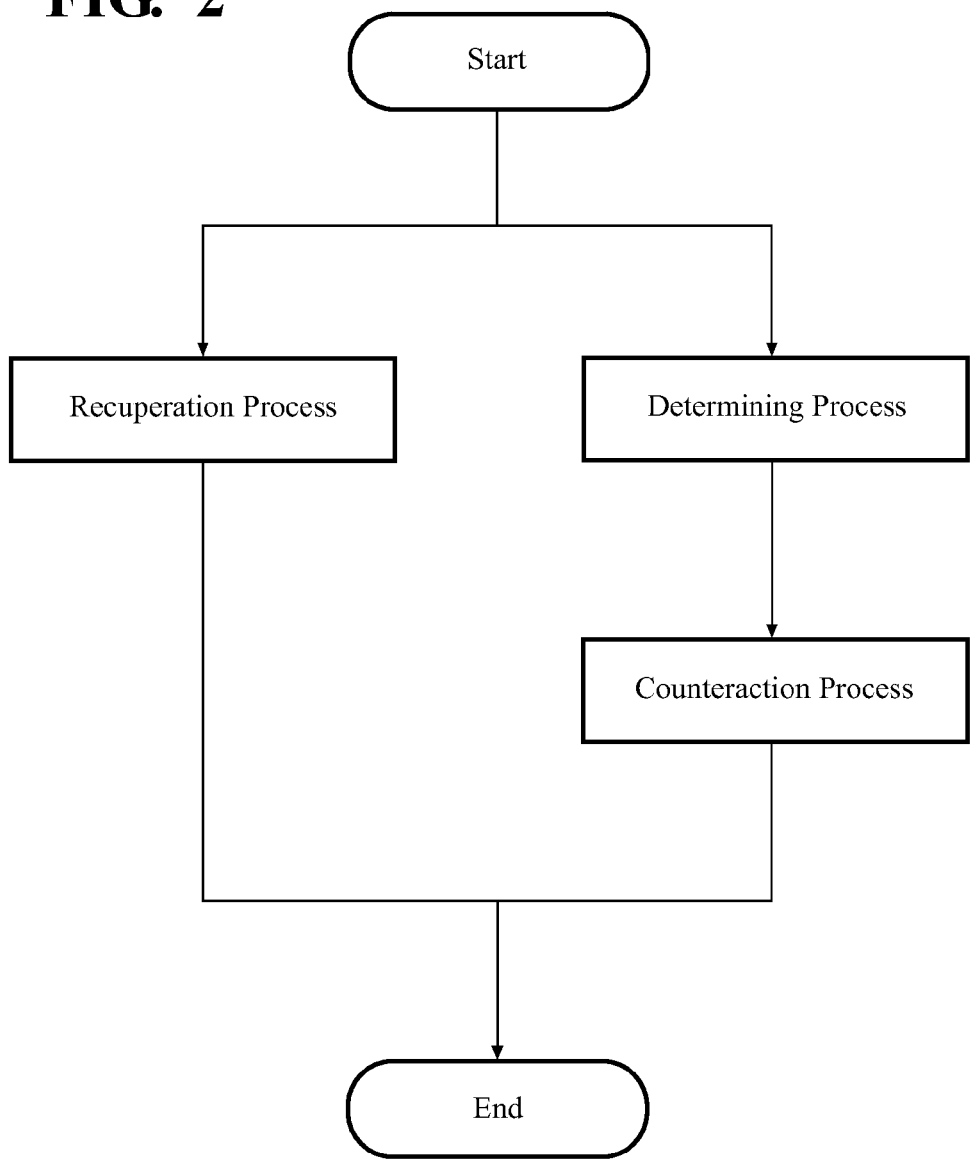
FIG. 2 is a flow chart of a method for braking recuperation according to the inventive subject matter.

The motor vehicle 10 has a control unit 18 that is configured to execute instructions and carry out a method 30 of the inventive subject matter. Referring now to FIG. 2, a method 30 of the inventive subject matter is described with reference to a flow diagram from start 31 to end 35. The method 30 may be open-loop or closed loop and is controlled by the control unit 18. The method starts 31 and a braking recuperation process is carried out 32. In this process kinetic energy of the vehicle 10 is converted into electrical energy by way of the generator 14. A torque, which is required to operate the generator 14, is conducted from the wheels 12 to the generator 14 by way of the drive train 13. The recuperation process 32 brings about a load torque to at least one of the wheels 12. The braking recuperation process 32 may act unequally on the wheels 12 of the motor vehicle 10 and as result, bring about undesired reactions of the motor vehicle 10. For example, a yawing torque can occur at the motor vehicle 10 as a result of an unequal distribution of load torque.

A determining process 33, determines the undesired influence on the motor vehicle 10 caused by the braking recuperation process 32. It is possible to directly measure the undesired influence and/or detect it on the basis of a reaction of the motor vehicle 10.

Determining the undesired influence directly may be accomplished by measuring the load torques acting on the wheels 12. If the torque which is necessary to drive the generator 14 is not distributed uniformly among all of the wheels 12, different load torques will be present at each wheel 12. The difference in load torque may be measured at the drive train 13. In particular, the load torque acting on the wheels of one of the axles 19, 20, may be determined in the determining process.

At the same time as directly determining the undesired influence, or as an alternative to direct determination, the undesired influence may be determined in the determining process 33 on the basis of a reaction, or current behavior, of the motor vehicle 10. For example, state variables such as longitudinal acceleration, steering wheel angle, yaw rate or lateral acceleration may be detected and evaluated.

The state variables may be detected by means of sensors (not shown) on the vehicles that are part of vehicle and driver assistance systems, such as ESP. ESP is a vehicle assistance system that improves the driving stability of the motor vehicle. The evaluation of such sensor data may also be performed in a manner such as computation or reconciliation with a model stored in controller memory. This simplifies implementation of the inventive subject matter. Additionally, the causes of undesired motor vehicle reactions may be counteracted at an early time.

An undesired influence on the motor vehicle which is caused by the braking recuperation process cars also be detected by evaluating current behavior of the motor vehicle, even without the difference in load torque being determined. Current state variable values may be evaluated in comparison to the stored model. The computation expenditure can be reduced. Additionally, this includes the possibility of counteracting the undesired influence or effect.

Upon determination of the undesired influence, a counteracting process 34 is initiated. The counteracting process 34 counteracts the influence of the braking recuperation process 32. According to the inventive subject matter, two different means, which may be applied simultaneously or individually will be described hereinafter. The counteracting process 34 may be executed by way of a braking intervention brought about by braking device 15, and/or by way of a torque shift brought about by the torque distribution device 16. Within an ESP it is possible to selectively brake individual wheels in order to generate compensation torques about a vertical axis of the vehicle and counteract undesired yawing. Within a torque vectoring system it is possible to distribute torques in a variable fashion between wheels of the motor vehicle, in particular between wheels of an axle, in order to actively influence the yawing behavior of the motor vehicle.

As a result of the counteracting process 34 by way of the braking device 15, a braking torque is applied to at least one of the wheels 12. This is configured, in such a way that the same total torques are present at two wheels 12 of the same axle 19, 20. The total torque per wheel 12 is the sum of the load torque caused by the braking recuperation process 32 and the braking torque caused by the braking intervention. The difference between the load torques at the wheels, caused by the braking recuperation process 32, is thereby compensated. The unequal load torques are directly counteracted, with the result that the unequal load torques cannot bring about any undesired reaction of the motor vehicle 10.

It is also possible that the counteracting process 34, by way of the brake device 15, does not counteract, or does not exclusively counteract, the cause of an undesired reaction of the motor vehicle 10, but instead the undesired reaction itself is counteracted by generating a counter-reaction. For example, the braking intervention may be executed such that a yawing torque, acting upon the motor vehicle 10, is generated as a compensation torque. In this regard, the braking intervention may also be executed at one of the axles 19, 20 at which no difference in load torque is present. In particular, the braking intervention may also be performed at one of the wheels 12 of one of the axles 19, 20 that is not coupled to the drive train 13.

The counteracting process 34 by way of the torque distribution device 16 changes a distribution of the torques in the drive train 13. The counteracting process 34 may be carried out by adapting a torque distribution, wherein the adaptation is performed in such a way that the same wheel longitudinal forces act at two wheels of an axle. In particular, the torques of the wheels of an axle 19 are varied. The counteracting process 34 is executed in such a way that the same wheel longitudinal forces act on the two wheels 12 of one of the axles 19. This also directly counteracts the unequal load torques, with the result that the unequal load torques cannot bring about an undesired reaction of the motor vehicle 10.

It is also possible that the counteracting process 34 by way of the torque distribution device 16 does not counteract, or does not exclusively counteract, the cause of the undesired reaction of the motor vehicle 10 but instead the undesired reaction itself is counteracted by generating a counter-reaction. It is therefore also conceivable that the torque shift is executed in such a way that a yawing torque which, acts on the motor vehicle 10 is generated as a compensation torque.

According to the inventive subject matter, kinetic energy of a motor vehicle 10 is converted into electrical energy by means of a generator 14 in a braking recuperation process 32. An undesired influence on the motor vehicle, which is caused by the braking recuperation process, is first determined 33 during the braking recuperation process 32 and the influence is subsequently counteracted in a counteracting process 34. As a result, undesired influences on the braking recuperation process can be compensated. This improves the driving stability and the driving comfort of the motor vehicle.

In the foregoing specification, the invention has been described with reference to specific example embodiments. Various modifications and changes may be made, however, without departing from the scope of the inventive subject matter as set forth in the claims. The specification and figures are illustrative, rather than restrictive, and modifications are intended to be included within the scope of the inventive subject matter. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the inventive subject matter, in addition to those not specifically recited, may be varied or otherwise particularly adapted to specific environments, manufacturing specifications, design parameters or other operating requirements without departing from the general principles of the same.

The invention claimed is:

1. A method, carried out in a controller of a motor vehicle having a plurality of wheels, to counteract an undesired influence on the motor vehicle, the method comprising the steps of:
    determining, during a braking recuperation process, the undesired influence that is caused by the braking recuperation process;
    counteracting the determined undesired influence using a vehicle system that affects torques present at one or more wheels of the plurality of vehicle wheels.

2. The method as claimed in claim 1 wherein the step of determining further comprises determining a difference between current load torques at two wheels of the plurality of wheels.

3. The method as claimed in claim 2 wherein the step of determining a difference between current load torques further comprises measuring the difference in load torque directly at a drive train of the motor vehicle.

4. The method as claimed in claim 2 wherein the step of determining a difference between current load torques further comprises the steps of:
    evaluating current behavior of the motor vehicle using vehicle state variables; and
    calculating the difference between current load torques from the evaluated current behavior of the motor vehicle.

5. The method as claimed in claim 1 wherein the step of counteracting the determined undesired influence further comprises applying a braking torque to at least one of the plurality of wheels using a braking device on the motor vehicle.

6. The method as claimed in claim 5 wherein the braking torque is applied such that a total load torque is applied to each of two wheels on a same axle of the motor vehicle, the total load torque is a sum of a load torque at the wheel caused by the braking recuperation process and a braking torque at the wheels caused by intervention of the braking device.

7. The method as claimed in claim 5 wherein applying the braking torque further comprises generating a yawing torque as a correction torque to at least one of the plurality of wheels.

8. The method as claimed in claim 1 wherein the step of counteracting the determined undesired influence further comprises adapting a distribution of braking torque to at least one of the plurality of wheels using a controllable torque distribution device on the motor vehicle.

9. The method as claimed in claim 8 wherein the step of adapting the distribution of braking torque further comprises generating a yawing torque as a correction torque.

10. A system for implementing a brake recuperation process of a regenerative braking system on a motor vehicle having a plurality of wheels and a plurality of vehicle sensors, the system comprising:
    a brake device selectively braking individual wheels of the plurality of wheels;
    a controller on the motor vehicle in communication with the brake device;
    a braking recuperation process, carried out in the controller, converting kinetic energy of the motor vehicle into electrical energy;
    an undesired influence determining process, carried out in the controller, identifying an undesired influence on the motor vehicle caused by the braking recuperation process;
    a counteracting process, carried out in the controller, generating and implementing a counter-reaction to offset the undesired influence caused by the braking recuperation process.

11. The system as claimed in claim 10 wherein the undesired influence determining process further comprises a direct determination of the undesired influence by measuring load torques acting on the wheels and identifying a difference in load torques acting on the wheels.

12. The system as claimed in claim 10 wherein the undesired influence determining process further comprises determining the undesired influence caused by the braking recuperation process on the basis of a reaction of the motor vehicle.

13. The system as claimed in claim 12 wherein the reaction of the motor vehicle is determined based on an evaluation of at least one of a longitudinal acceleration, a steering wheel angle, a yaw rate, or a lateral acceleration.

14. The system as claimed in claim 13 wherein the evaluation further comprises a comparison of measured signal values and stored signal values.

15. The system as claimed in claim 10 wherein the counteracting process further comprises a brake torque applied to at least one of the plurality of wheels by way of the braking device to counteract the undesired influence caused by the braking recuperation process.

16. The system as claimed in claim 15 wherein the brake torque applied to at least one of the plurality of wheels further comprises a total load torque applied to two wheels on a same axle of the motor vehicle, the total load torque is a sum of a load torque the wheel caused by the braking recuperation process and a brake torque at the wheel caused by intervention of the brake device.

17. A system as claimed in claim 10 wherein the vehicle further comprises a controllable torque distribution device and the counteracting process further comprises adaptation of a distribution of braking torque to at least one of the wheels on the motor vehicle.

18. The system as claimed in claim 17 wherein the adaptation of a distribution of braking torque further comprises a yawing torque to counteract the undesired influence caused by the braking recuperation process.

19. The system as claimed in claim 10 wherein the vehicle further comprises a controllable torque distribution device and the counteracting process further comprises a combination of a brake torque applied to at least one of the plurality of wheels by way of the braking device and adaptation of a distribution of braking torque to at least one of the wheels on the motor vehicle.

20. A system for implementing a brake recuperation process of a regenerative braking system on a motor vehicle having a plurality of wheels and a plurality of vehicle sensors, the system comprising:
- a brake device selectively braking individual wheels of the plurality of wheels;
- a controllable torque distribution device selectively distributing a torque to individual wheels of the plurality of wheels at each axle of the motor vehicle;
- a controller on the motor vehicle in communication with the brake device;
- a braking recuperation process, carried out in the controller, converting kinetic energy of the motor vehicle into electrical energy;
- an undesired influence determining process, carried out in the controller, identifying an undesired influence on the motor vehicle caused by the braking recuperation process; and
- a counteracting process, carried out in the controller, generating and implementing a counter-reaction to offset the undesired influence caused by the braking recuperation process, the counteracting process is a combination of a brake torque applied to at least one of the plurality of wheels by way of the braking device and adaptation of a distribution of braking torque to at least one of the wheels on the motor vehicle.

* * * * *